(12) United States Patent
Lee

(10) Patent No.: US 8,018,513 B2
(45) Date of Patent: Sep. 13, 2011

(54) ADAPTED PIECEWISE LINEAR PROCESSING DEVICE

(75) Inventor: Pyeong-Woo Lee, Chungcheongbuk-do (KR)

(73) Assignee: Crosstek Capital, L.L.C., Wilmington, DE (US)

( * ) Notice: Subject to any disclaimer, the term of this patent is extended or adjusted under 35 U.S.C. 154(b) by 616 days.

(21) Appl. No.: 12/071,692

(22) Filed: Feb. 25, 2008

(65) Prior Publication Data

US 2008/0204583 A1    Aug. 28, 2008

(30) Foreign Application Priority Data

Feb. 23, 2007 (KR) .................. 10-2007-0018340

(51) Int. Cl.
*H04N 5/202* (2006.01)
(52) U.S. Cl. .................. 348/297; 345/77; 345/89
(58) Field of Classification Search .................. None
See application file for complete search history.

(56) References Cited

U.S. PATENT DOCUMENTS

| 5,585,927 A * | 12/1996 | Fukui et al. .................. 358/518 |
| 7,154,562 B1 * | 12/2006 | Chowdhury et al. ......... 348/674 |
| 2007/0182845 A1 * | 8/2007 | Hunter .......................... 348/362 |

FOREIGN PATENT DOCUMENTS

| KR | 1991-0017357 | 11/1991 |
| KR | 1998-0066570 | 10/1998 |
| KR | 2000-0073083 | 12/2000 |
| KR | 2006-0084718 | 7/2006 |

* cited by examiner

*Primary Examiner* — Nicholas G Giles
*Assistant Examiner* — Yih-Sien Kao
(74) *Attorney, Agent, or Firm* — McAndrews, Held & Malloy, Ltd.

(57) ABSTRACT

A piecewise linear processing device applies different amplification rates according to a general environment and a low luminance environment where much noise exists. The piecewise linear processing device includes a knee point storing unit configured to store a user's default setting value and low luminance setting value; a luminance detecting unit configured to detect a noisy environment to output a current luminance information signal and a maximum luminance information signal; an adaptive knee point supply unit configured to receive the default setting value, the low luminance setting value, the current luminance information signal, and the maximum luminance information signal to supply a adjusted adaptive knee point according to a degree of noise; and a piecewise linear processing unit configured to apply a section amplification rate to an input data on the basis of a region corresponding to the adaptive knee point.

23 Claims, 8 Drawing Sheets

ADAPTED PIECEWISE LINEAR PROCESSING DEVICE

CROSS-REFERENCE(S) TO RELATED APPLICATIONS

The present invention claims priority of Korean patent application number 2007-0018340, filed on Feb. 23, 2007, which is incorporated by reference in its entirety.

BACKGROUND OF THE INVENTION

The present invention relates to semiconductor design technology, and more particularly, to a piecewise linear processing device for applying different amplification rates according to a general environment and a low luminance environment where much noise exists.

To reinforce a conventional piecewise linear processing method used for a gamma correction circuit and a contrast correction circuit in an image processing, the present invention provides a function that can be provided to an image signal processor (ISP) mounted in a complementary metal oxide semiconductor (CMOS) image sensor.

The function will be described in detail with reference to FIGS. 1A and 1B.

FIG. 1A is a graph illustrating a function used for a conventional piecewise linear processing device, illustrating a level of an output data with respect to an input data.

Referring to FIG. 1A, the piecewise linear processing device amplifies an input signal in a low code region with a high amplification rate and amplifies an input signal in a high code region with a relatively low amplification rate so as to make up for identifying ability.

When processing actual input signals, the piecewise linear processing device uses the linear function divided into a plurality of sections as illustrated in FIG. 1B. A knee point defining each section is set by a user. The conventional piecewise linear processing device using the linear function applies an amplification rate of a relevant section to the corresponding input data IN_FX_DT to output as the output data OUT_FX_DT.

The piecewise linear processing device uses the plurality of linear functions illustrated in FIG. 1B because of a limitation in a semiconductor area. In other words, when a hardware is realized to process an input signal through a function curve illustrated in FIG. 1A, a large area is required, which means the increase of a manufacturing cost. Therefore, a hardware processes an input signal using the linear function (shown in FIG. 1B) realized by dividing the curve function into a plurality of sections, instead of the curve function of FIG. 1A.

For reference, the above-described piecewise linear processing device is used for a gamma correction circuit and a contrast correction circuit inside an image processing device. The piecewise linear processing device can be used for a charged coupled device (CCD) image processing device, and used for all image circuits and processing devices where a piecewise linear processing method is used. Description will be made with reference to FIG. 2.

FIG. 2 is a block diagram of a conventional piecewise linear processing device, which has an operation curve such as the linear function illustrated in FIG. 1B.

Referring to FIG. 2, the conventional piecewise linear processing device includes a default knee point storing unit 10 for storing a user's default setting value Am, and a piecewise linear processing unit 20 for applying a section amplification rate to input data IN_FX_DT on the basis of regions defined by knee points of the default knee point storing unit 10 to output the output data OUT_FX_DT.

An operation will be briefly described below. When the user applies a default setting value Am on the basis of a general environment, the default knee point storing unit 10 stores the value.

The piecewise linear processing unit 20 receives the knee points of the default knee point storing unit 10, and applies a section amplification rate corresponding to the knee point to the input data IN_FX_DT to output the output data OUT_FX_DT.

As described above, the conventional linear processing device collectively applies the default setting value Am applied on the basis of a general environment to all the environments to process the input data IN_FX_DT.

Meanwhile, since a noise in a low code band of the input data IN_FX_DT is amplified at a large amplification rate under a low luminance environment where much noise exists, an entire screen noise increases.

A conventional piecewise linear processing device using different linear functions for a general environment and a low luminance environment will be described with reference to FIG. 3.

FIG. 3 is a block diagram of another conventional piecewise linear processing device.

Referring to FIG. 3, the conventional piecewise linear processing device includes a default knee point storing unit 30 for storing a user's default setting value Am and a low luminance setting value Bm, a luminance detecting unit 40 for detecting a low luminance environment to output a control signal, an output control unit 50 for outputting the default setting value Am or the low luminance setting value Bm as a knee point in response to the control signal, and a piecewise linear processing unit 60 for applying a section amplification rate to the input data IN_FX_DT on a region corresponding to the knee point to output the output data OUT_FX_DT.

The default knee point storing unit 30 includes a first knee point storing unit 32 for storing an applied default setting value Am, and a second knee point storing unit 34 for storing a low luminance setting value Bm.

As described above, the conventional piecewise linear processing device receives the low luminance setting value Bm used for a low luminance environment, and uses the low luminance setting value Bm as a knee point under the low luminance environment in response to the control of the luminance detecting unit 40. Therefore, the piecewise linear processing device of FIG. 3 solves a limitation that noise is amplified in a low luminance region compared to the piecewise linear processing device of FIG. 2.

FIG. 4 is a graph illustrating the linear function of the piecewise linear processing device of FIG. 3.

When a user applies a default setting value Am and a low luminance setting value Bm, they are stored in corresponding knee storing units 32 and 34, respectively. Under a general environment, the piecewise linear processing unit 60 receives as a knee point the default setting value Am that is provided by the output control unit 50 and stored in the first knee point storing unit 32. Also, the piecewise linear processing unit 60 applies a relevant section amplification rate to the input data IN_FX_DT on the basis of a knee point corresponding to the default setting value Am to output the output data OUT_FX_DT. That is, under a general environment, the piecewise linear processing device has a linear function including A0-A6 such as the default setting value Am.

Meanwhile, under the low luminance environment, the luminance detecting unit 40 detects the low luminance environment to activate a control signal. The output control unit 50 outputs the low luminance setting value Bm stored in the second knee point storing unit 34 as a knee point in response to the control signal. The piecewise linear processing unit 60 applies a relevant section amplification rate to the input data IN_FX_DT on the basis of a knee point corresponding to the low luminance setting value Bm to output the output data OUT_FX_DT. Therefore, under the low luminance environment, the piecewise linear processing device has a linear function including B0-B6 such as the low luminance setting value Bm.

Meanwhile, a change in the linear function is described in an aspect of an output range versus an input range such as a region A. First, a difference between two input values on an X-axis of the linear function is the input range, and a difference between two output values on a Y-axis of the linear function is the output range. The region A represents an output range versus an input range corresponding to the points A0 and A1 of the linear function for the general environment. Comparison of an output range versus an input range under the general environment with an output range versus an input range under the low luminance environment shows that a ratio of an output range to an input range reduces under the low luminance environment. As described above, an influence by noise is reduced by reducing an amount of an output range versus an input range.

Therefore, the conventional piecewise linear processing device illustrated in FIG. 3 uses different linear functions having different amplification rates, respectively, depending on the general environment and the low luminance environment. More specifically, the conventional piecewise linear processing device illustrated in FIG. 3 prevents noise from being excessively amplified under the low luminance environment by decreasing the amplification rate of a low code region and increasing the amplification rate of a high code region under the low luminance environment.

However, as illustrated in FIG. 4, since an image output on a screen has a drastic change at a threshold where the linear function used for the general environment changes into the linear function used for the low luminance environment, the user determines that a malfunction has occurred.

SUMMARY OF THE INVENTION

Embodiments of the present invention are directed to provide a piecewise linear processing device that applies different amplification rates according to a general environment and a low luminance environment where much noise exists.

In accordance with an aspect of the present invention, there is provided a piecewise linear processing device including a knee point storing unit configured to store a user's default setting value and low luminance setting value; a luminance detecting unit configured to detect a noisy environment to output a current luminance information signal and a maximum luminance information signal; an adaptive knee point supply unit configured to receive the default setting value, the low luminance setting value, the current luminance information signal, and the maximum luminance information signal to supply a adjusted adaptive knee point according to a degree of noise; and a piecewise linear processing unit configured to apply a section amplification rate to an input data on the basis of a region corresponding to the adaptive knee point.

In accordance with another aspect of the present invention, there is provided a piecewise linear processing device including a default knee point storing unit configured to store a default setting value; a luminance detecting unit configured to detect a degree of noise to output a current luminance information signal and a maximum luminance information signal; an adaptive knee point supply unit configured to supply a adjusted adaptive knee point using the default setting value and an up-code information signal and a down-code information signal according to the degree of noise; and a piecewise linear processing unit configured to apply a section amplification rate to an input data on the basis of a region corresponding to the adaptive knee point to output an output data.

In accordance with another aspect of the present invention, there is provided a piecewise linear processing device including a luminance detecting unit configured to detect a low luminance environment to output a current luminance information signal and a maximum luminance information signal; an adaptive knee point calculator configured to receive the current luminance information signal, the maximum luminance information signal, and first to N-th default setting values to calculate first to N-th adaptive knee points; a first knee point storing unit configured to store and output the first default setting value and the first adaptive knee point being applied; a first piecewise linear processing unit configured to apply a section amplification rate to a first input data on the basis of a region corresponding to the first adaptive knee point to output a first output data; a second knee point storing unit configured to store and output the second default setting value and the second adaptive knee point; a second piecewise linear processing unit configured to apply a section amplification rate to a second input data on the basis of a region corresponding to the second adaptive knee point to output a second output data; an N-th knee point storing unit configured to store and output the N-th default setting value and the N-th adaptive knee point; and an N-th piecewise linear processing unit configured to apply a section amplification rate to an N-th input data on the basis of a region corresponding to the N-th adaptive knee point to output an N-th output data.

DESCRIPTION OF SPECIFIC EMBODIMENTS

Hereinafter, an adapted piecewise linear processing device in accordance with the present invention will be described in detail with reference to the accompanying drawings.

Figure 1A:
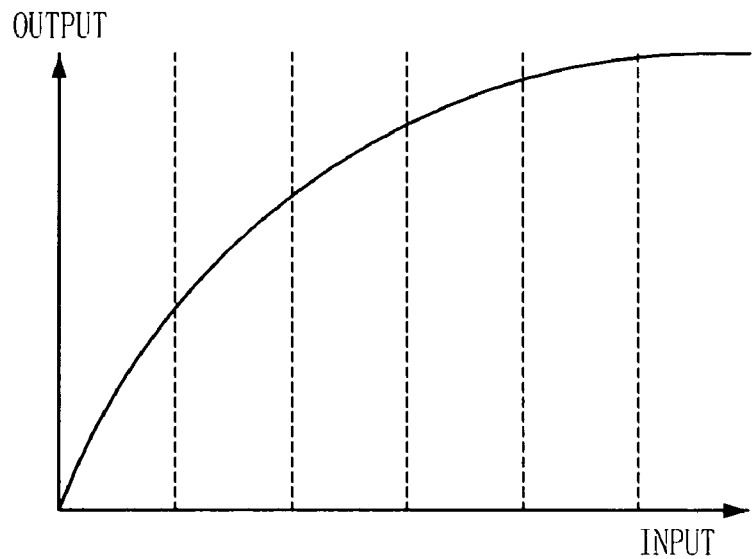
FIG. 1A is a graph illustrating a function used for a conventional piecewise linear processing device, showing a level of an output data with respect to an input data.
Figure 1B:
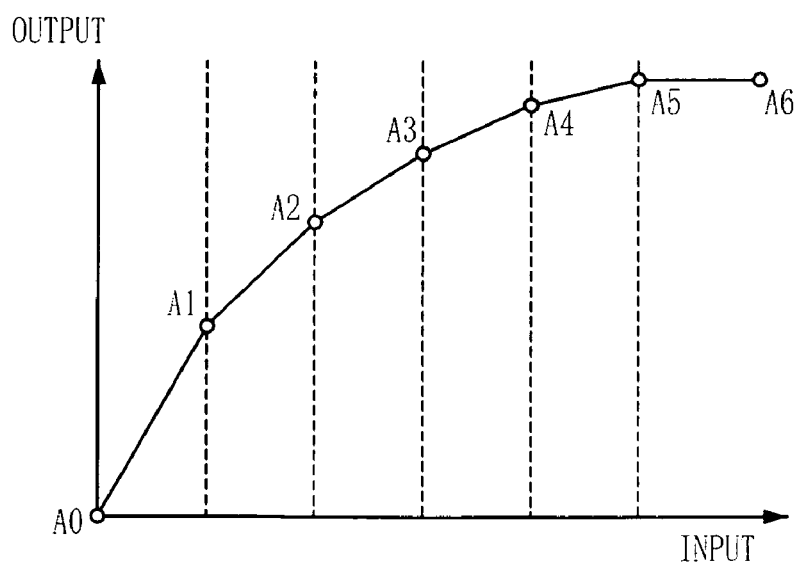
FIG. 1B is a graph illustrating a linear function with a plurality of sections.
Figure 2:
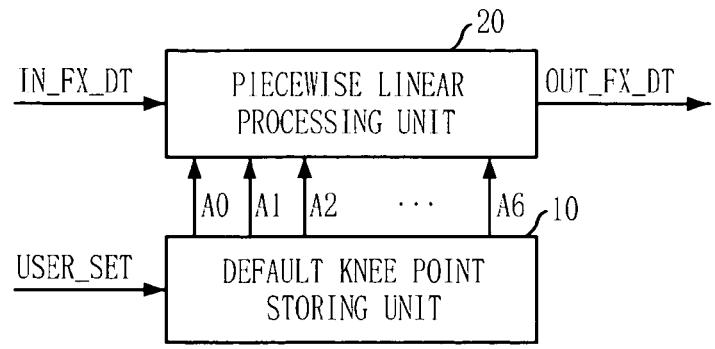
FIG. 2 is a block diagram of a conventional piecewise linear processing device.
Figure 3:
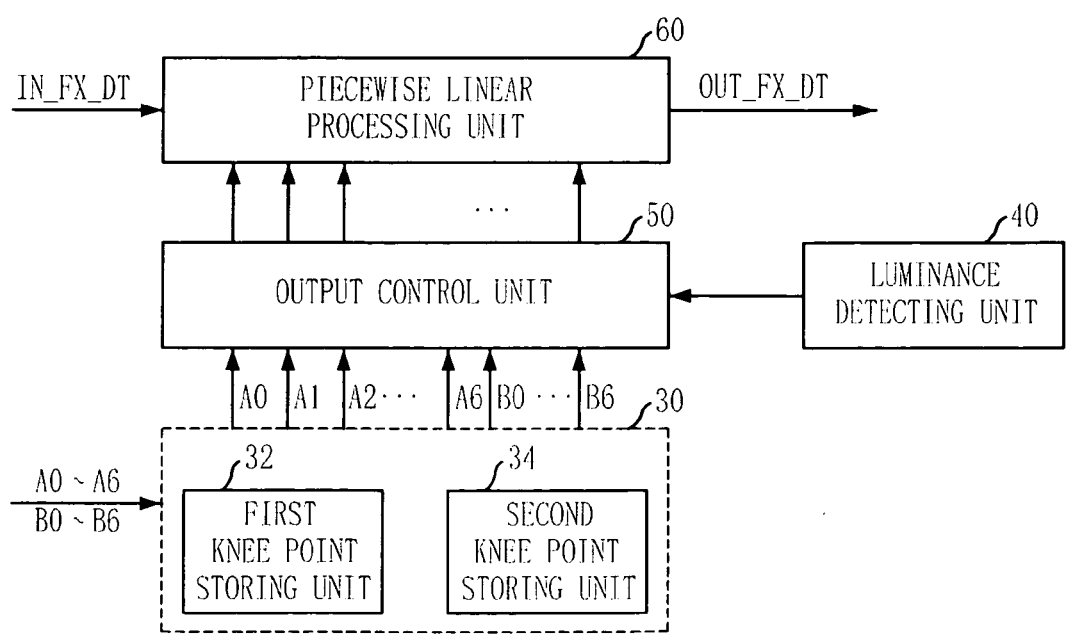
FIG. 3 is a block diagram of another conventional piecewise linear processing device.
Figure 4:
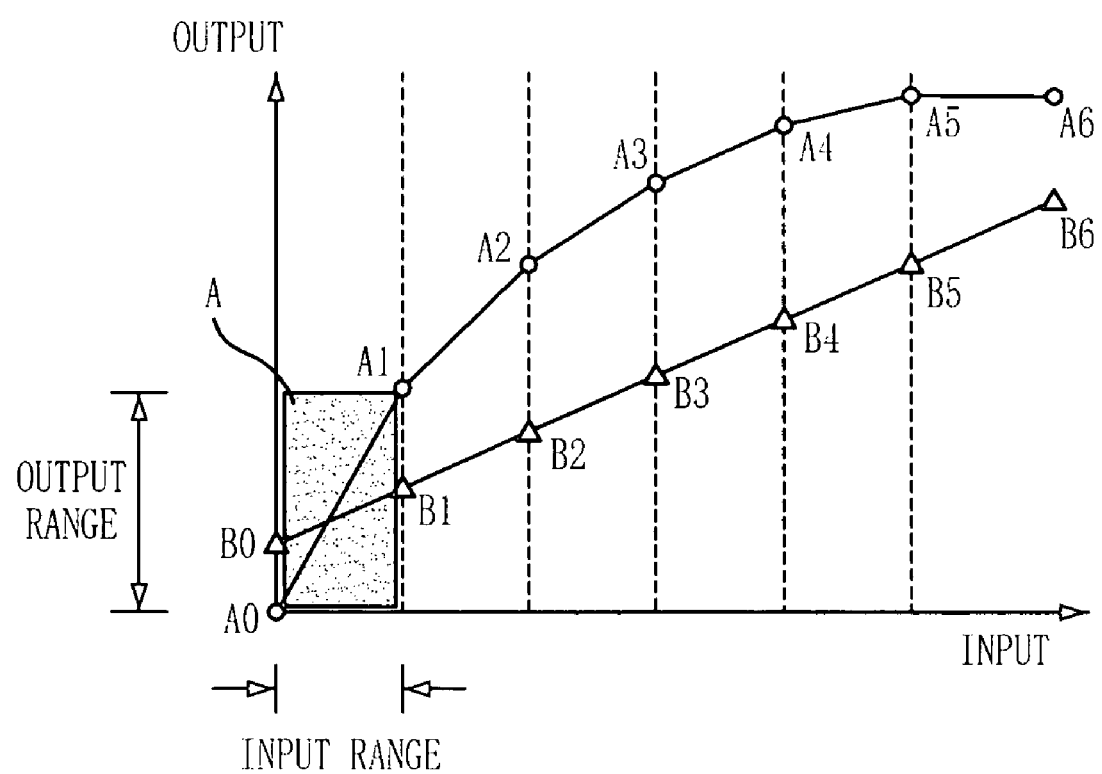
FIG. 4 is a graph illustrating the linear function of the piecewise linear processing device of FIG. 3.
Figure 5:
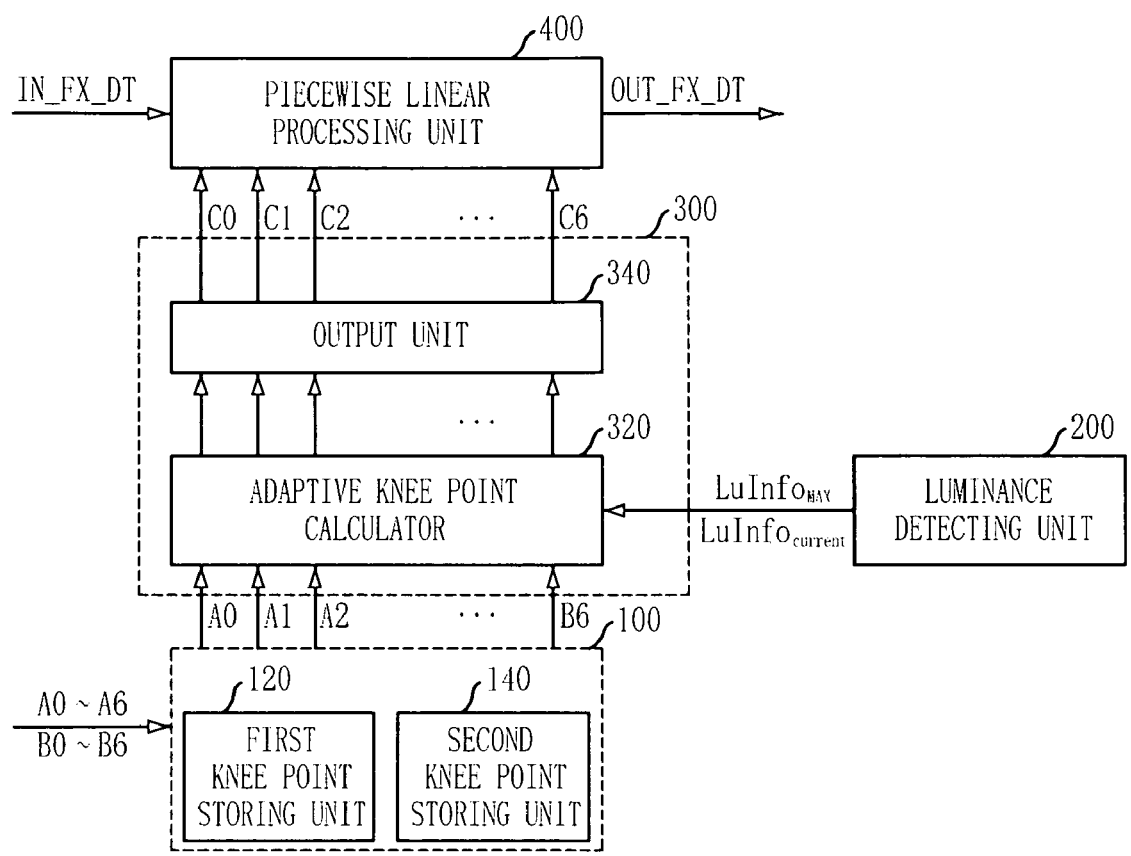
FIG. 5 is a block diagram of a piecewise linear processing device in accordance with an embodiment of the present invention.

FIG. 5 is a block diagram of a piecewise linear processing device in accordance with an embodiment of the present invention.

Referring to FIG. 5, the piecewise linear processing device includes a knee point storing unit 100 for storing a user's default setting value Am and low luminance setting value Bm, a luminance detecting unit 200 for detecting an environment having much noise to output luminance information signals $LuInfo_{current}$ and $LuInfo_{MAX}$, an adaptive knee point supply unit 300 for receiving the default setting value Am, the low luminance setting value Bm, the luminance information signals $LuInfo_{current}$ and $LuInfo_{MAX}$ to supply a adjusted adaptive knee point according to a degree of noise, and a piecewise linear processing unit 400 for applying a section amplification rate to an input data IN_FX_DT on the basis of a region corresponding to the adaptive knee point.

The knee point storing unit 100 includes a first knee point storing unit 120 for storing the applied default setting value Am, and a second knee point storing unit 140 for storing the low luminance setting value Bm.

The adaptive knee point supply unit 300 includes an adaptive knee point calculator 320 and an output unit 340. The adaptive knee point calculator 320 outputs the default setting value Am under a general environment and outputs a value between the default setting value Am and the low luminance setting value Bm under a noisy environment. The output unit 340 stores an output signal of the adaptive knee point calculator 320 and outputs the output signal as an adaptive knee point.

For reference, the default setting value Am is a knee point used for processing an input data IN_FX_DT under the general environment, and the low luminance setting value Bm is a knee point used for processing an input data IN_FX_DT under the low luminance environment where much noise exists.

The luminance detecting unit 200 observes a current exposure time and a screen gain factor in cooperation with an automatic exposure unit (not shown) to calculate a current luminance and supply luminance information signals $LuInfo_{current}$ and $LuInfo_{MAX}$ to the adaptive knee point supply unit 300.

Figure 6A:
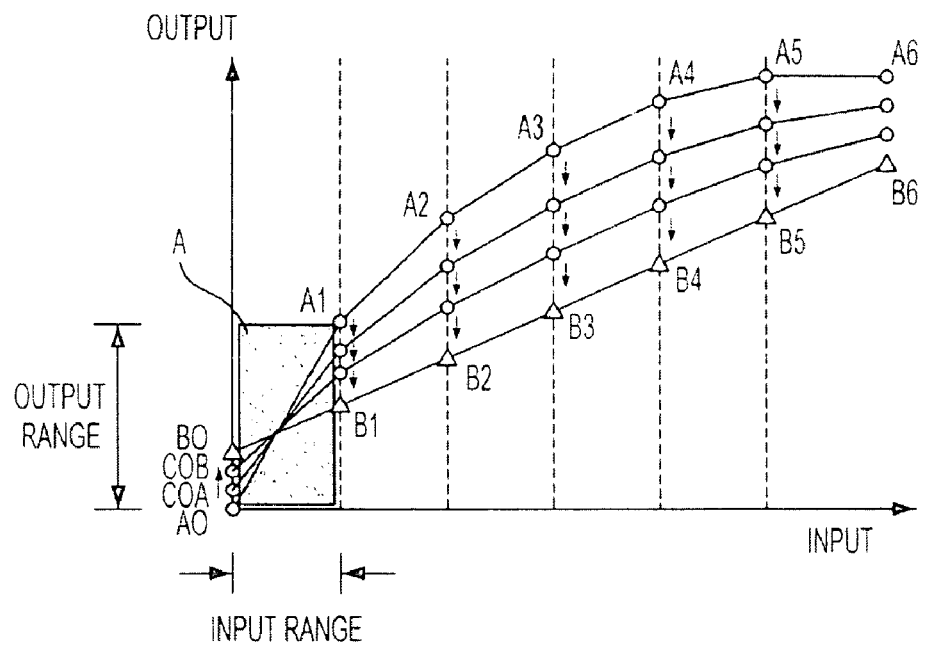
FIG. 6A is a graph illustrating the linear function of the piecewise linear processing device of FIG. 5.

FIG. 6A is a graph illustrating the linear function of the piecewise linear processing device of FIG. 5. The piecewise linear processing device in accordance with the embodiment of the present invention will be described with reference to FIG. 6A.

First, a user applies the default setting value Am and the low luminance setting value Bm, and the corresponding knee point storing units 120 and 140 store them.

The adaptive knee point supply unit 300 supplies the default setting value Am (A0-A6) as an adaptive knee point under the general environment. Subsequently, the piecewise linear processing unit 400 applies a section amplification rate to the input data IN_FX_DT on the basis of a region corresponding to the adaptive knee point having the default setting value Am to output the output data OUT_FX_DT.

Meanwhile, the luminance detecting unit 200 outputs luminance information signals $LuInfo_{current}$ and $LuInfo_{MAX}$ under the low luminance environment.

Therefore, the adaptive knee point calculator 320 receives the default setting value Am, the low luminance setting value Bm, and the luminance information signals $LuInfo_{current}$ and $LuInfo_{MAX}$ to supply a adjusted adaptive knee point according to a degree of noise. In other words, for the supplied adaptive knee point, the default setting value Am to be applied to the general environment and the low luminance setting value Bm to be applied to the low luminance environment where screen noise is serious are interpolated to calculate and apply the adaptive knee point for a current luminance in real time as illustrated in FIG. 6A.

Therefore, in the case where there exists much noise as in the low luminance environment, the input data IN_FX_DT is processed using the low luminance setting value Bm as illustrated in FIG. 6A to prevent an amplification rate from being concentrated on a low code region due to the linear function used for the general environment. In addition, to reduce error recognition that may occur during this switching operation, an output range is gradually shifted from A0 to B0 via C0A and C0B. Here, C0A and C0B mean intermediate values between A0 and B0.

Meanwhile, a change in the linear function is described in an aspect of an output range versus an input range such as a region A. First, a difference between two input values on an X-axis of the linear function is the input range, and a difference between two output values on a Y-axis of the linear function is the output range. The region A represents an output range versus an input range corresponding to the points A0 and A1 of the linear function for the general environment. Comparison of an output range versus an input range under the general environment with an output range versus an input range corresponding to the points B0 and B1 under the low luminance environment shows that a ratio of an output range to an input range gradually reduces under the low luminance environment.

As described above, the adaptive knee point supply unit calculates and applies in real time an adaptive knee point that can be applied to a current luminance whenever a luminance environment changes to prevent a drastic change at the knee point that has occurred under a threshold environment where the general environment changes into the low luminance environment.

Meanwhile, an adaptive knee point calculating method of the adaptive knee point calculator 320 is described in detail using Equations below.

$$K = \frac{LuInfo_{current}}{LuInfo_{MAX}} \qquad \text{Eq. 1}$$

First, the adaptive knee point calculator 320 calculates a luminance variable K meaning a degree of noise. That is, since the degree of noise can be represented by current luminance information, the variable K is obtained by dividing the luminance information signals $LuInfo_{current}$ by $LuInfo_{MAX}$ as in Equation 1 above.

$$Cm = (Am - Bm) \times K + Bm \qquad \text{Eq.2}$$

Subsequently, the adaptive knee point calculator 320 multiplies a difference between the default setting value Am and the low luminance setting value Bm by the variable K representing a brightness degree of current luminance as described in Equation 2 to determine an adaptive knee point Cm. That is, the adaptive knee point calculator 320 determines to use how close value to the default setting value Am from the low luminance setting value Bm using the variable K.

A process of calculating an adaptive knee point is described using a specific numerical value as an example. First, it is assumed that the luminance information signal $LuInfo_{MAX}$ is an integer of 16 and the current luminance information signal $LuInfo_{current}$ is 4. Also, it is assumed that the default setting value Am is 135 and the low luminance setting value Bm is 114.

A luminance variable K is calculated to be 4/16=0.25 according to Equation 1. An adaptive knee point C1m is calculated to be (135−114)×0.25+114=119.25 according to Equation 2.

Also, a case where a current luminance information signal LuInfo$_{current}$ increases to 10 is examined. In this case, a luminance variable K increases to 10/16=0.625 according to Equation 1. Therefore, an adaptive knee point C2m is calculated to be (135−114)×0.625+114=127.1250 according to Equation 2.

Figure 6B:
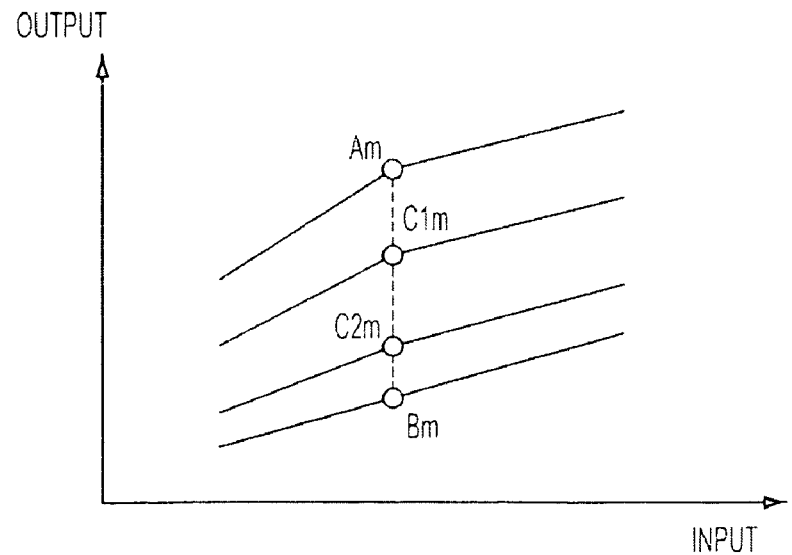
FIG. 6B is a graph illustrating an adaptive knee point setting as a current luminance information signal ($LuInfo_{current}$) changes.

As described above, FIG. 6B illustrates adaptive knee point settings when a current luminance information signal LuInfo$_{current}$ changes from 4 to 10. Referring to the foregoing and FIG. 6B, since current luminance gets bright, the adaptive knee point Cm moves from C1m=119.25 to C2m=127.1250 as the luminance information signal LuInfo$_{current}$ increases. That is, since luminance getting bright means reduced noise, it is revealed that the adaptive knee point Cm gradually approaches the default setting value Am applied to a normal state where no noise exists. In other words, when there is much noise and luminance decreases, the adaptive knee point gradually changes from the default setting value Am and approaches the luminance setting value Bm.

For reference, though the piecewise linear processing device in accordance with the embodiment of the present invention uses the luminance information signals LuInfo$_{current}$ and LuInfo$_{MAX}$ as a degree of noise, other reference values representing noise can be used as a degree of noise if necessary.

Meanwhile, the above-described calculation process is performed during a vacant time V_time where pixel output does not occur between frames on a pixel output timing, which will be described in detail with reference to the drawings.

Figure 7:
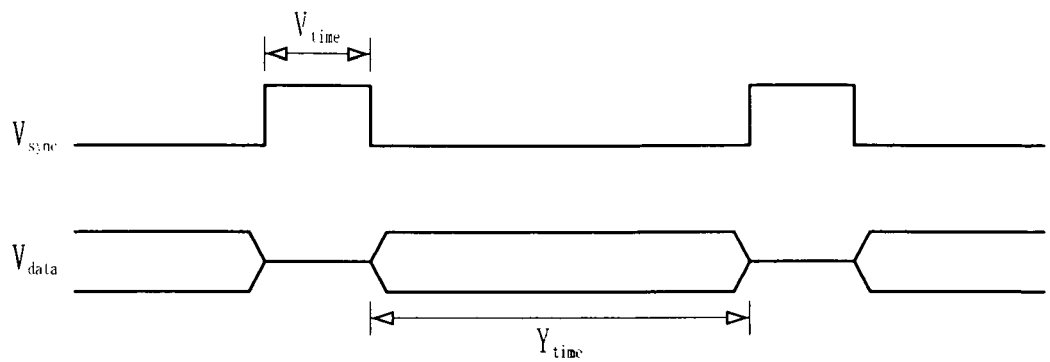
FIG. 7 is a timing diagram illustrating an output timing of a signal ($V_{Sync}$) based on an ITU_R BT601 standard used for an image sensor including the above illustrated piecewise linear processing device.

FIG. 7 is a timing diagram illustrating an output timing of a signal V$_{Sync}$ based on an ITU_R BT601 standard used for an image sensor including the above illustrated piecewise linear processing device.

Referring to FIG. 7, the output timing of a signal V$_{Sync}$ is divided into an output time Y_time during which a pixel of an image signal Y_data, that is, an output data OUT_FX_DT is output, and a vacant time V_time for which pixel output does not occur.

Meanwhile, the piecewise linear processing device performs a piecewise linear process on the input data IN_FX_DT in real time to output the output data OUT_FX_DT for the output time Y_time. For this purpose, when driving of the adaptive knee point supply unit 300 is also performed for an output time Y_time, which is duration during which data are processed, an additional time for calculating Equations 1 and 2 will be consumed for the same output time Y_time. The additional time consuming will increase realization costs.

Therefore, a time consumed for calculating an adaptive knee point is not added to the output time Y_time by allowing the calculating of the adaptive knee point to be performed for the vacant time V_time. That is, realization costs caused by the calculating of the adaptive knee point can be minimized Meanwhile, in case of the piecewise linear processing device in accordance with the embodiment of the present invention, the default setting value Am to be applied to a normal luminance state, which is a general environment having no noise, and the low luminance setting value Bm to be applied to an environment where much noise exists should be set. Therefore, the piecewise linear processing device has a limitation that has to include the second knee point storing unit 140 for storing the low luminance setting value Bm.

Another embodiment of the present invention that does not require setting of a knee point under the low luminance environment will be described.

Figure 8:
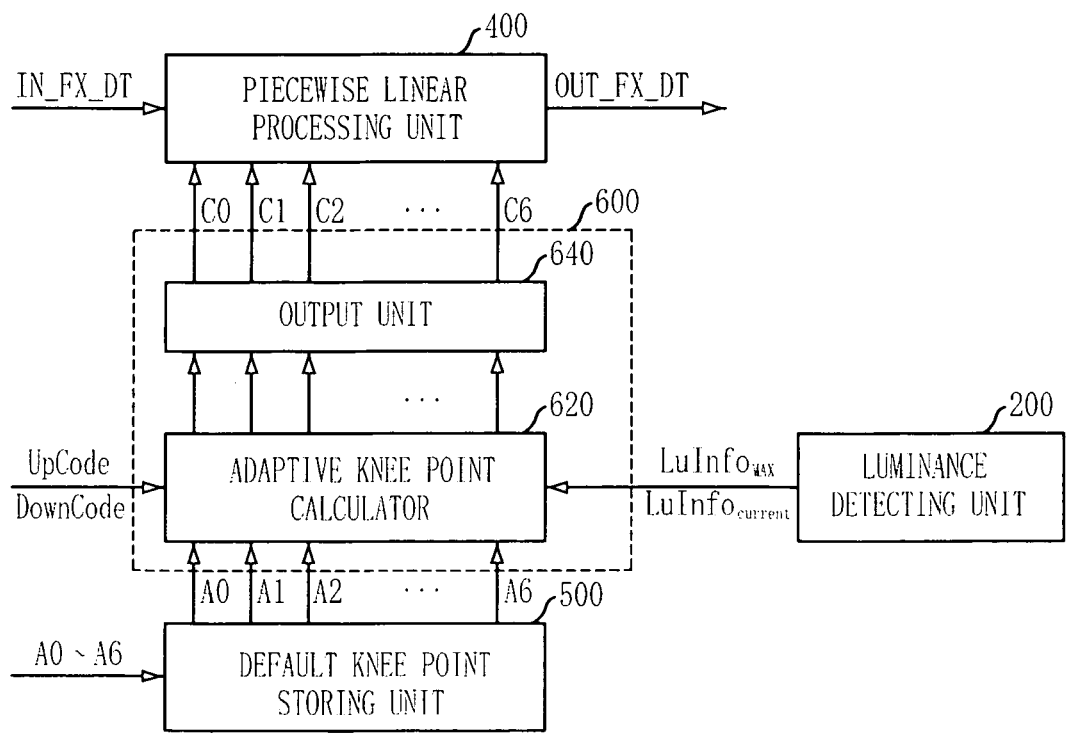
FIG. 8 is a block diagram of a piecewise linear processing device in accordance with another embodiment of the present invention.

FIG. 8 is a block diagram of a piecewise linear processing device in accordance with another embodiment of the present invention.

Referring to FIG. 8, the piecewise linear processing device includes a default knee point storing unit 500, a luminance detecting unit 200, an adaptive knee point supply unit 600, and a piecewise linear processing unit 400.

The default knee point storing unit 500 stores a user's default setting value Am. The luminance detecting unit 200 detects a degree of noise to output the luminance information signals LuInfo$_{current}$ and LuInfo$_{MAX}$. The adaptive knee point supply unit 600 supplies a adjusted knee point using the default setting value Am and code information signals UpCode and DownCode according to the degree of noise. The piecewise linear processing unit 400 applies a piecewise amplification rate to the input data IN_FX_DT on the basis of a region corresponding to a knee point of the adaptive knee point supply unit 600 to output the output data OUT_FX_DT.

The adaptive knee point supply unit 600 includes an adaptive knee point calculator 620 and an output unit 640. The adaptive knee point calculator 620 outputs the default setting value Am under a general environment, and outputs an adaptive knee point corresponding to a degree of noise using the default setting value Am and the code information signals UpCode and DownCode under a noisy environment. The output unit 640 stores an output signal of the adaptive knee point calculator 620 to output the output signal as an adaptive knee point.

As described above, since the piecewise linear processing device in accordance with the another embodiment of the present invention sets a knee point with consideration of only the general environment, it does not require a storing unit for storing the low luminance setting value Bm illustrated in FIG. 5 and thus is advantageous in an aspect of an area.

Meanwhile, a calculation method of the adaptive knee point calculator 620 will be described in detail using the following equation. Particularly, a process of calculating the low luminance setting value Bm required for the low luminance environment where much noise exists is described.

$$Slope_{REF} = \frac{(OutputCode_{MAX} - DownCode) - UpCode}{InputCode_{MAX}}, \quad \text{Eq. 3}$$

where UpCode and DownCode are values applied for calculating the low luminance setting value Bm, InputCode_Max and OutputCode_Max are a maximum input code and a maximum output code, respectively, used for the piecewise linear processing device.

First, the adaptive knee point calculator 620 applies applied code information signals UpCode and DownCode to Equation 3 to obtain a slope Slope$_{REF}$.

$$Bm = Slope_{REF} \times XPt_{AM} + UPCode \quad \text{Eq. 4}$$

Subsequently, the adaptive knee point calculator 620 multiplies the slope Slope$_{REF}$ obtained using Equation 3 by a coordinate value XPt$_{Am}$ on an X-axis of each default setting value Am, and adding the UpCode, thereby obtaining the low luminance setting value Bm.

As described above, Equations 3 and 4 have been added to calculate the adaptive knee point, but the luminance setting value can be obtained through calculation, so that a storing unit for storing the luminance setting value is not needed and thus an increase in a hardware area can be prevented.

$$K = \frac{LuInfo_{current}}{LuInfo_{MAX}} \quad \text{Eq. 5}$$

$$Cm = (Am - Bm) \times K + Bm$$

Meanwhile, the adaptive knee point calculator 620 calculates an adaptive knee point using Equation 5, which is the same as Equations 1 and 2, so detailed descriptions thereof are omitted. Also, referring to FIG. 7, the above-described calculation process is performed for a vacant time V_time where pixel output does not occur between frames on a pixel output timing.

Therefore, the piecewise linear processing device including the adaptive knee point calculator 620 calculates the low luminance setting value Bm under the low luminance environment using Equations 3 and 4. Since a user does not need to separately apply the low luminance setting value Bm for the low luminance environment, it is advantageous in an aspect of an area.

Meanwhile, the above-described piecewise linear processing device can be used for gamma correction, contrast correction, and saturation correction. Therefore, N piecewise linear processing devices for the gamma correction, contrast correction, and saturation correction can be provided inside an image sensor. In the case where each of the N piecewise linear processing devices includes an adaptive knee point calculator and a luminance detecting unit, and the hardware realization area of the adaptive knee point calculator is A, the area increases by N×A, which causes a burden in an aspect of realization. To address this limitation, central adaptive knee point calculator and luminance detecting unit are shared by a plurality of piecewise linear processing devices, so that an additional increase in the hardware realization area can be prevented even when the number of the piecewise linear processing devices increases. The construction of the piecewise linear processing device in accordance with this case is described with reference to a drawing.

Figure 9:
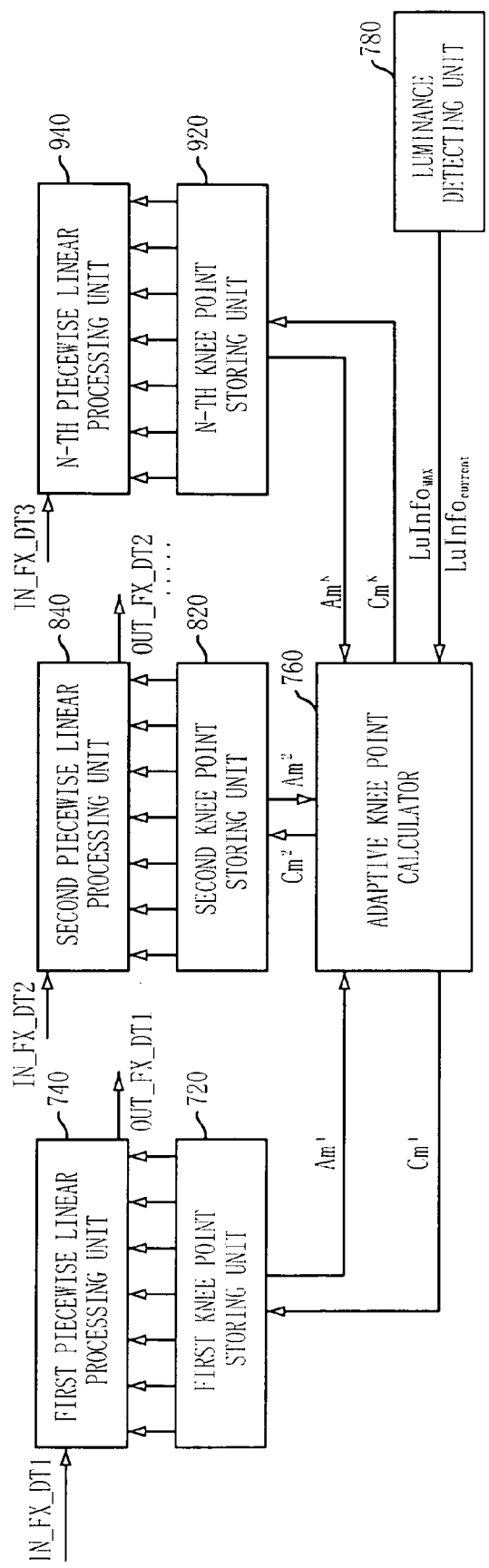
FIG. 9 is a block diagram of a piecewise linear processing device including N piecewise linear processing units in accordance with still another embodiment of the present invention.

FIG. 9 is a block diagram of a piecewise linear processing device including N piecewise linear processing units in accordance with still another embodiment of the present invention.

Referring to FIG. 9, the piecewise linear processing device includes a luminance detecting unit 780, an adaptive knee point calculator 760, a first knee point storing unit 720, a first piecewise linear processing unit 740, a second knee point storing unit 820, a second piecewise linear processing unit 840, an N-th knee point storing unit 920, and an N-th piecewise linear processing unit 940. The luminance detecting unit 780 detects a low luminance environment to output luminance information signal LuInfo$_{current}$. The adaptive knee point calculator 760 receives luminance information signals LuInfo$_{current}$ and LuInfo$_{MAX}$ and first to N-th default setting values Am$^1$, Am$^2$, ..., Am$^n$ to calculate first to N-th adaptive knee points Cm$^1$, Cm$^2$, ..., Cm$^n$. The first knee point storing unit 720 stores and outputs the applied first default setting value Am$^1$ and first adaptive knee point Cm$^1$. The first piecewise linear processing unit 740 applies a section amplification rate to a first input data IN_FX_DT on the basis of a region corresponding to the first adaptive knee point Cm$^1$ to output a first output data OUT_FX_DT. The second knee point storing unit 820 stores and outputs the applied second default setting value Am$^2$ and second adaptive knee point Cm$^2$. The second piecewise linear processing unit 840 applies a section amplification rate to a second input data IN_FX_DT on the basis of a region corresponding to the second adaptive knee point Cm$^2$ to output a second output data OUT_FX_DT. The N-th knee point storing unit 920 stores and outputs the applied N-th default setting value Am$^N$ and N-th adaptive knee point Cm$^N$. The N-th piecewise linear processing unit 940 applies a section amplification rate to an N-th input data IN_FX_DT on the basis of a region corresponding to the N-th adaptive knee point Cm$^N$ to output an N-th output data OUT_FX_DT.

As described above, the piecewise linear processing device having the N piecewise linear processing units in accordance with the still another embodiment shares the adaptive knee point calculator 760 and the luminance detecting unit 780. The driving of the piecewise linear processing device will be described with reference to an operation timing diagram thereof.

Figure 10:
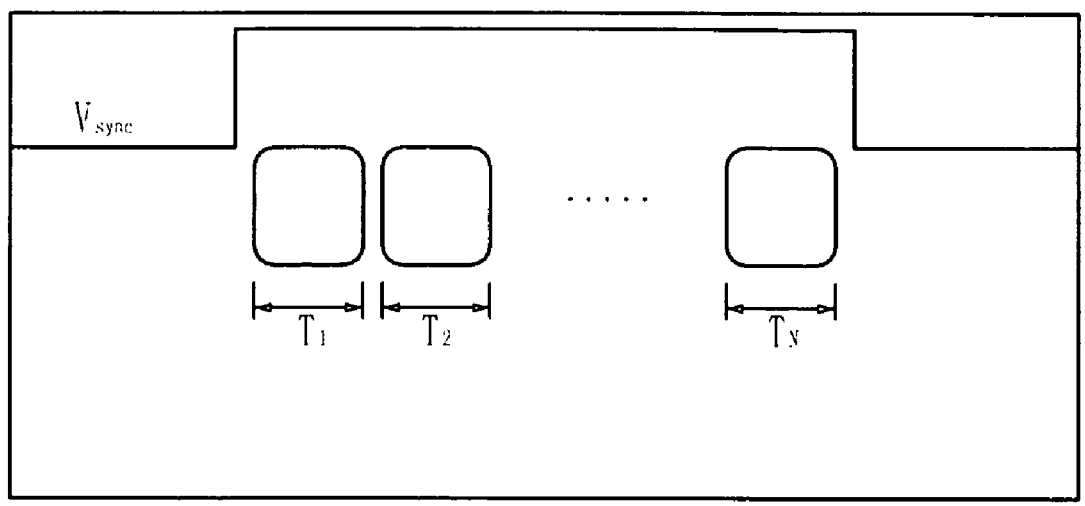
FIG. 10 is a timing diagram illustrating an output timing of a signal ($V_{Sync}$) based on an ITU_R BT601 standard used for an image sensor.

FIG. 10 is a timing diagram illustrating an output timing of a signal V$_{Sync}$ based on an ITU_R BT601 standard used for an image sensor. Particularly, a timing of calculating an adaptive knee point in case of using a plurality of piecewise linear processing units is illustrated.

As illustrated in FIG. 10, the piecewise linear processing device performs adaptive knee point calculation for a vacant time V-time where pixel output does not occur between frames. Particularly, the piecewise linear processing device calculates the first to N-th adaptive knee points Cm$^1$, Cm$^2$ ... Cm$^N$ using a time sharing method. In other words, the piecewise linear processing device performs calculation for a time T1 to update the first adaptive knee point Cm1 of the first knee point storing unit 720. When the calculation is completed, updating of the second adaptive knee point Cm$^2$ of the second knee point storing unit 820 starts.

Therefore, the piecewise linear processing device including the plurality of piecewise linear processing devices in accordance with the still another embodiment can prevent an additional increase in an area caused by separate luminance detecting unit and adaptive knee point calculator while having a plurality of piecewise linear processing units by sharing the central luminance detecting unit and adaptive knee point calculator.

For reference, in the case where the number of the piecewise linear processing units provided to the piecewise linear processing device in accordance with the still another embodiment is too large to complete all updating operations within the vacant time V_time, a separate adaptive knee point calculator may be provided to some of the piecewise linear processing units. Also, a plurality of central adaptive knee point calculators may be provided and shared.

Therefore, the present invention detects a degree of noise using a representative value LuInfo$_{current}$ representing a current luminance state to control and generate a knee point to be used for the piecewise linear processing device according to the degree of noise. Accordingly, a limitation that noise is amplified in a specific region is resolved. A drastic change on a final output screen occurring when the conventional linear function changes can be prevented.

Also, the present invention drives a plurality of piecewise linear processing units using a time sharing method to reduce a burden caused by an increase in a hardware area in an aspect of realization.

That is, the present invention not only minimizes a signal-to-noise ratio under low luminance but also improves a burden caused by hardware realization.

The present invention provides a gradually adjusted knee point between a knee point used for a general environment and a knee point used for a noisy environment according to a degree of noise to output a stable screen having small noise.

While the present invention has been described with respect to the specific embodiments, it will be apparent to those skilled in the art that various changes and modifications may be made without departing from the spirit and scope of the invention as defined in the following claims.

What is claimed is:

1. An image processing system comprising:
   a unit configured to:
   receive a default setting value and a low luminance setting value, and
   determine an adaptive knee point at least by multiplying a variable representing a degree of environmental noise with a difference between the default setting value and the low luminance setting value; and
   a piecewise linear processing unit configured to amplify input data according to the adaptive knee point.

2. The image processing system of claim 1, wherein the degree of environmental noise corresponds to a current luminance.

3. The image processing system of claim 2, further comprising a luminance detecting unit configured to calculate the current luminance according to a current exposure time.

4. The image processing system of claim 1, wherein the unit is configured to receive a plurality of default setting values and a plurality of low luminance setting values and to supply a plurality of adaptive knee points according to the degree of environmental noise.

5. The image processing system of claim 4, wherein the unit is configured to determine the plurality of adaptive knee points by interpolating between the plurality of default setting values and the plurality of low luminance setting values according to the degree of environmental noise.

6. The image processing system of claim 1, wherein the unit further comprises:
   an adaptive knee point calculator configured to determine the adaptive knee point according to the default setting value, the low luminance setting value, and the degree of environmental noise; and
   an output unit configured to store the adaptive knee point and to supply the adaptive knee point to the piecewise linear processing unit.

7. The image processing system of claim 1, wherein the piecewise linear processing unit is configured to amplify the input data in a region corresponding to the adaptive knee point.

8. A method for processing an image, the method comprising:
   receiving a default setting value and a low luminance setting value;
   determining a degree of environmental noise; and
   determining an adaptive knee point at least by multiplying a variable representing the degree of environmental noise with a difference between the default setting value and the low luminance setting value.

9. The method of claim 8, further comprising determining the degree of environmental noise according to a current luminance.

10. The method of claim 9, further comprising:
    observing a current exposure time; and
    determining the current luminance according to the current exposure time 11. The method of claim 8, wherein said determining an adaptive knee point further comprises interpolating between the default setting value and the low luminance setting value according to the degree of environmental noise.

12. The method of claim 8, further comprising:
    determining a region of the input data corresponding to the adaptive knee point; and
    forming output data by amplifying the region of the input data according to the adaptive knee point to form output data.

13. The method of claim 11, further comprising providing the output data for at least one of gamma correction, saturation correction, or contrast correction.

14. The method of claim 8, wherein said receiving a default setting value and a low luminance setting value further comprises receiving a plurality of default setting values and a plurality of low luminance setting values; and
    wherein said determining said an adaptive knee point further comprises determining a plurality of adaptive knee points according to the plurality of default setting values, the plurality of low luminance setting values, and the degree of environmental noise.

15. An image processing system comprising:
    an adaptive knee point calculator configured to determine an adaptive knee point at least by multiplying a variable representing a degree of environmental noise with a difference between a default setting value and a low luminance setting value; and
    an output unit configured to store the adaptive knee point and to supply the adaptive knee point.

16. The system of claim 15 further comprising a piecewise linear processing unit configured to:
    receive the adaptive knee point from the output unit; and
    apply a section amplification rate to a region of the input data corresponding to the adaptive knee point, wherein the section amplification rate corresponds to the adaptive knee point.

17. The system of claim 15, wherein the degree of environmental noise corresponds to a current luminance.

18. The system of claim 17, further comprising a luminance detecting unit configured to calculate the current luminance according to a current exposure time.

19. The system of claim 15, wherein the adaptive knee point calculator is configured to determine the adaptive knee point at a vacant time between frames.

20. The system of claim 15, wherein the adaptive knee point calculator unit is configured to receive a plurality of default setting values and a plurality of low luminance setting values and to determine a plurality of adaptive knee points according to the degree of environmental noise.

21. The image processing system of claim 1, wherein the unit is further configured to determine the adaptive knee point at least by adding the low luminance setting value to a result from multiplying the variable representing the degree of environmental noise with the difference between the default setting value and the low luminance setting value.

22. The method of claim 8, wherein said determining an adaptive knee point further comprises adding the low luminance setting value to a result from multiplying the variable representing the degree of environmental noise with the difference between the default setting value and the low luminance setting value.

23. The image processing system of claim 5, wherein the adaptive knee point calculator is further configured to determine the adaptive knee point by adding the low luminance setting value to a result from multiplying the variable representing the degree of environmental noise with the difference between the default setting value and the low luminance setting value.

* * * * *

UNITED STATES PATENT AND TRADEMARK OFFICE
CERTIFICATE OF CORRECTION

PATENT NO. : 8,018,513 B2  
APPLICATION NO. : 12/071692  
DATED : September 13, 2011  
INVENTOR(S) : Lee Page 1 of 1

It is certified that error appears in the above-identified patent and that said Letters Patent is hereby corrected as shown below:

Column 11, line 63, in Claim 10, delete "time" and insert -- time. --.

Column 12, line 59, in Claim 23, delete "claim 5," and insert -- claim 15, --.

Signed and Sealed this  
Sixth Day of March, 2012

David J. Kappos  
*Director of the United States Patent and Trademark Office*